United States Patent [19]
Moser

[11] Patent Number: 5,474,308
[45] Date of Patent: Dec. 12, 1995

[54] COLLET STOP

[76] Inventor: Hansjurg Moser, Oberdorfstrasse, Frutigen, Switzerland, 3714

[21] Appl. No.: 119,154
[22] PCT Filed: Jan. 25, 1993
[86] PCT No.: PCT/CH93/00019
    § 371 Date: Jan. 12, 1994
    § 102(e) Date: Jan. 12, 1994
[87] PCT Pub. No.: WO93/14897
    PCT Pub. Date: Aug. 5, 1993

[30] Foreign Application Priority Data

Jan. 23, 1992 [CH] Switzerland ............... 182/92

[51] Int. Cl.$^6$ .................................. B23B 31/20
[52] U.S. Cl. ........................................ 279/156
[58] Field of Search ................. 82/155; 279/156

[56] References Cited

U.S. PATENT DOCUMENTS

| | | | |
|---|---|---|---|
| 2,469,160 | 5/1949 | Evans | 279/156 |
| 2,502,719 | 4/1950 | Haley | 279/46 |
| 2,871,023 | 1/1959 | McCormick | 279/51 |
| 2,922,656 | 1/1960 | Belloli | 279/46 |
| 3,385,607 | 5/1968 | Hughes | 279/156 |
| 3,540,748 | 5/1968 | Buck | 279/1 |
| 3,599,997 | 8/1971 | Oliver | 279/156 |
| 3,615,101 | 10/1971 | Oliver | 279/15 |
| 3,718,339 | 2/1973 | Dunham et al. | 279/156 |
| 4,552,370 | 11/1985 | Baumgartner | 279/156 |

FOREIGN PATENT DOCUMENTS

| | | | |
|---|---|---|---|
| 356575 | 5/1988 | European Pat. Off. | |
| 2535634 | 9/1983 | France | |
| 317977 | 1/1957 | Switzerland | |
| 839727 | 6/1960 | United Kingdom | 279/156 |

Primary Examiner—Steven C. Bishop
Attorney, Agent, or Firm—Zarley, McKee, Thomte, Voorhees, & Sease

[57] ABSTRACT

The collet stop (1) comprises a clamping disk (15) placeable on the edge (17) of a collet (2) and a chuck body (21) displaceable relative to this clamping disk, having three radially unscrewable tapped bolts (25, 26, 27) which rest against the rearward ends of the slots (6) of a collet. By means of a tightening screw (31), the chuck body (21) can be displaced relative to the clamping disk (15), and the conical ends (34), provided with a hexagonal socket, of the tapped bolts caused to rest against the slot ends. Screwed into the tightening screw (31) is a threaded rod (48) which is provided at its end with a stop disk (52) for the workpiece to be machined. The collet is not crushed or deformed by the collet stop, the collet stop being insertable as a whole into the collet from the rear. As a result of the conical ends (34) of the tapped bolts (25), the collet stop (1) rests against all three ends (38) of the slots (6) of the collet.

13 Claims, 6 Drawing Sheets

COLLET STOP

BACKGROUND OF THE INVENTION

The present invention relates to a collet stop as well as to a stop disk and a stop bolt for a collet stop.

In a known collet stop, by driving a tightening screw into a chuck body, three balls disposed regularly over the periphery of the chuck body, supported in corresponding openings, are pressed radially outward by the tightening screw and brace the chuck body in the annular area of the collet. Thereby, however, this part of the collet is crushed, whereby the collet can no longer be inserted in the adapter sleeve. Previously known from EP-A-0 356 575 is a chuck for a turning lathe in which an insert is screwed into an insert nut, which may lead to deformation of the clamp. Conical surfaces at the end of the collet and on the insert cause a deformation of the clamp. Radially outward projecting noses disposed on the insert nut are so formed that, as a rule, only one nose will rest against the end of a slot of the collet since the slots are worked inaccurately. Furthermore, on account of the quick change of the direction of rotation from left to right in turning lathes in the subject of the above-mentioned publication, the insert may loosen.

SUMMARY OF THE INVENTION

It is a task of the present invention to avoid the disadvantages of the prior art and to develop a collet stop for a conventional collet in such a way that during the machining of the workpiece chucked in the collet, the stop for the workpiece cannot be axially displaced by the forces occurring during the machining, and the collet is not crushed or deformed by the collet stop. The collet stop shall be insertable in the collet as a whole from the rear. This is achieved according to the invention by features described herein. Furthermore, it is a task of a preferred embodiment of the present invention to form the collet stop in such a way that the stop takes place at the edge of all slots of the collet, even if the slots are inaccurately worked. This is achieved according to the invention in that the chucking elements are formed tapering or conical at their outer ends. A further task of a preferred embodiment of the present invention is to be able to displace the chucking organ with the chucking elements axially on the collet from outside. This is achieved according to the invention by at least one clamping means extending through the chucking organ. Furthermore, it is a task of a preferred exemplified embodiment of the invention to lock a stop disk placed on the stop means, or a stop bolt, against axial displacement. This is achieved according to the invention by a setscrew extending through the stop means.

Exemplified embodiments of the invention, as well as their use, are described in detail below with the aid of the enclosed drawing.

DETAILED DESCRIPTION OF THE PREFERRED EMBODIMENT

Figure 1:
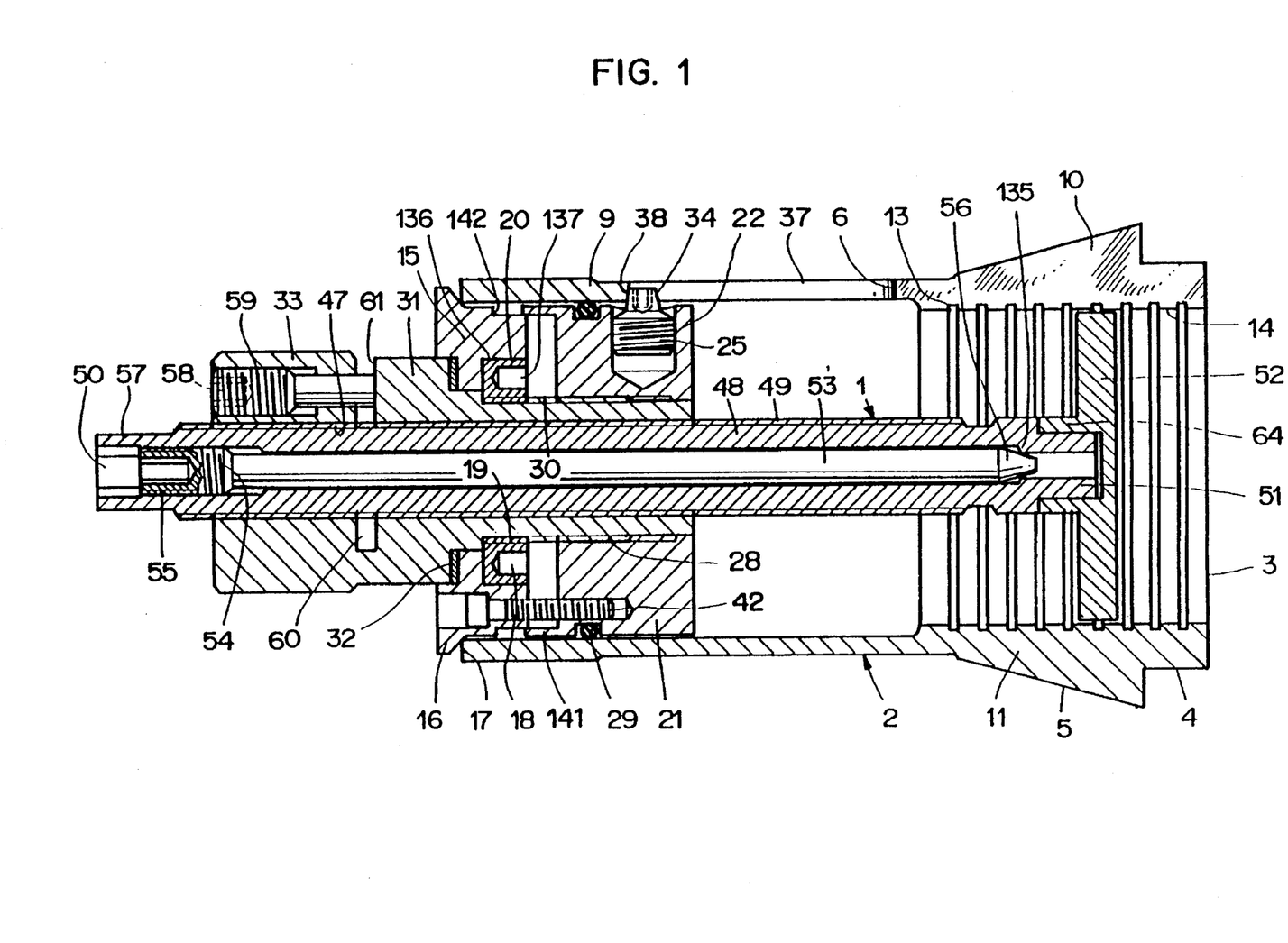
FIG. 1 shows a longitudinal section through a first exemplified embodiment of the collet stop with the use of stop disks.
Figure 2:
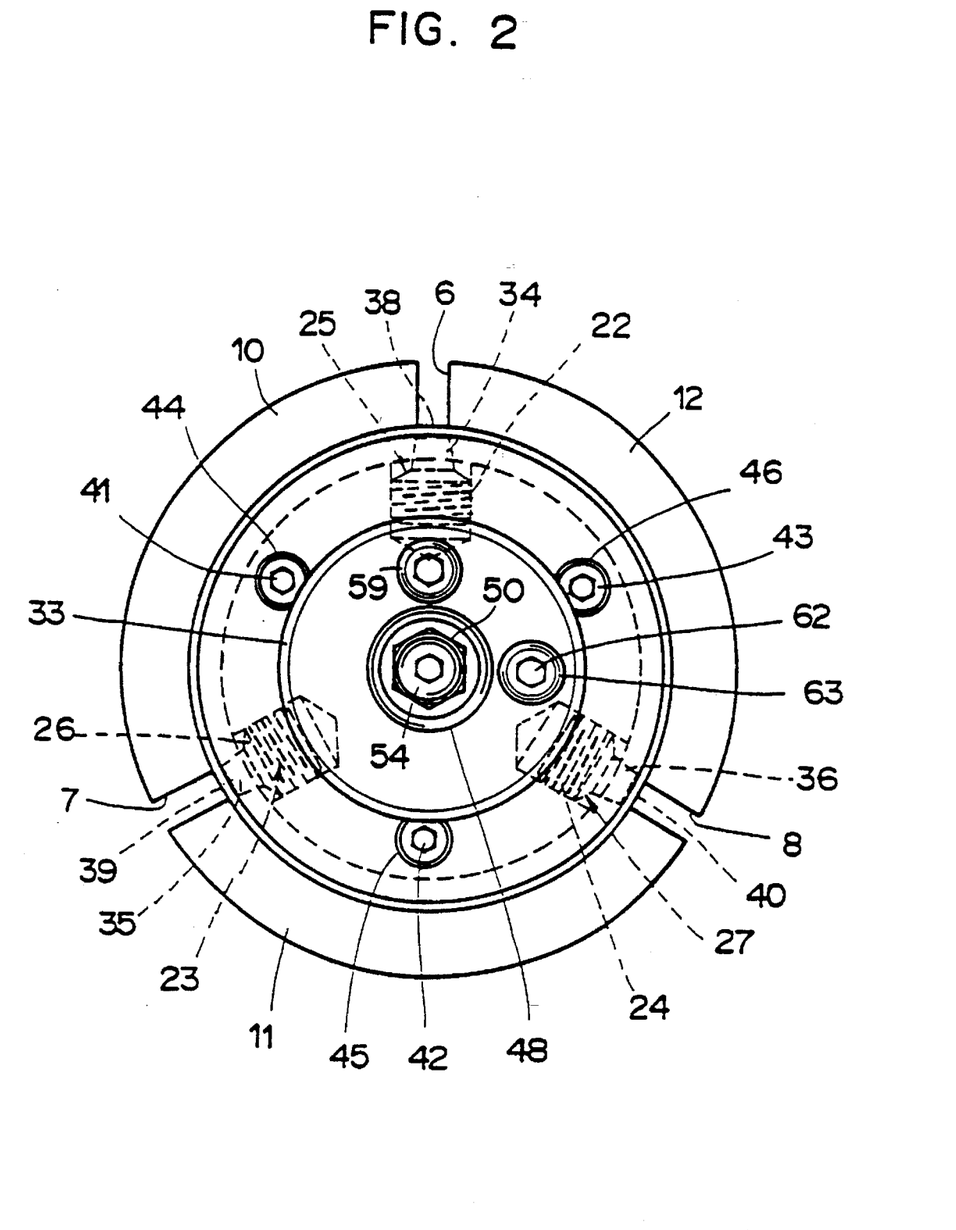
FIG. 2 shows a view from the left according to FIG. 1.
Figure 3:
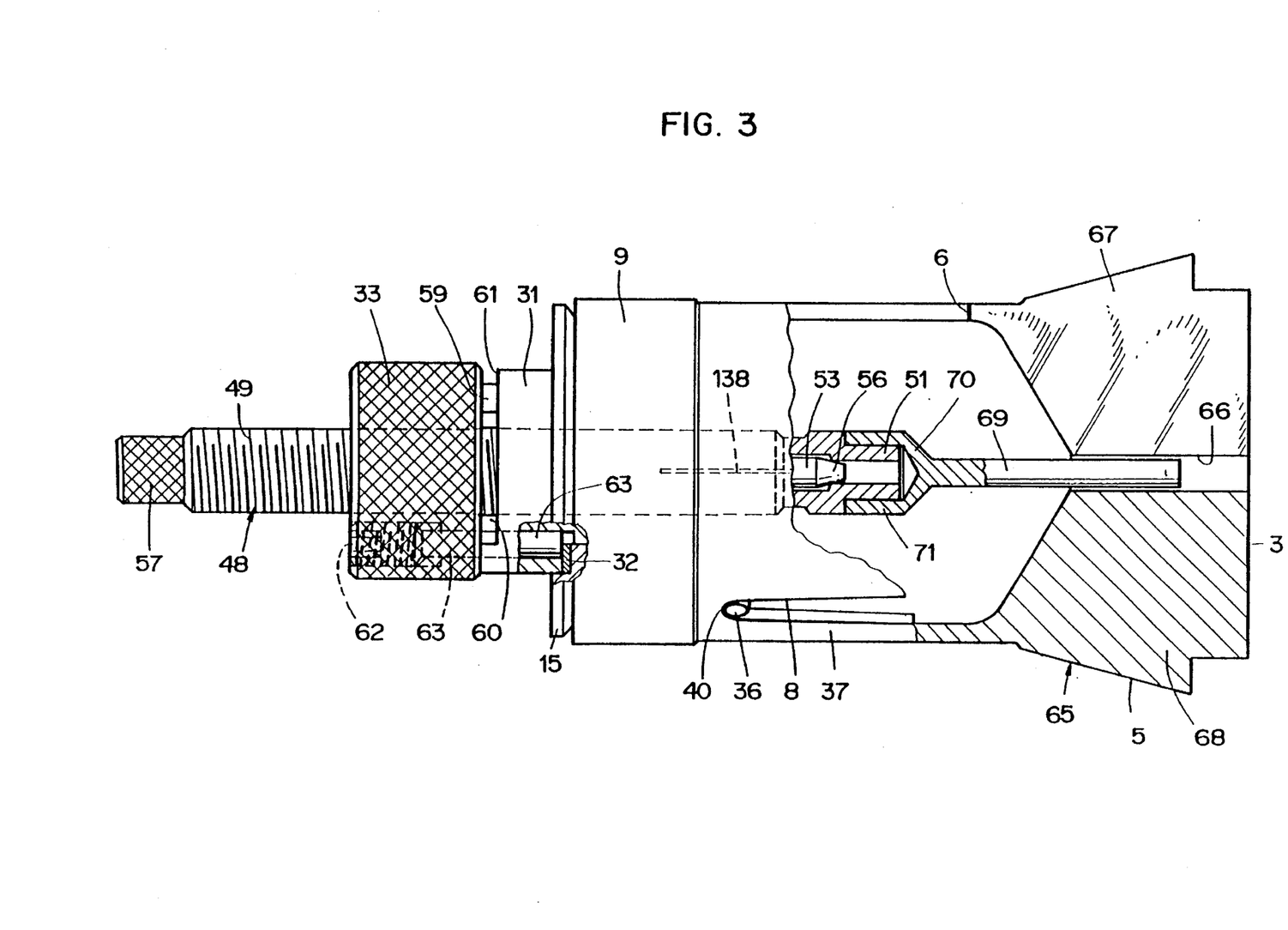
FIG. 3 shows a longitudinal section through the first exemplified embodiment with the use of stop bolts.

The first exemplified embodiment of the collet stop is described with the aid of FIGS. 1 to 3. The complete collet stop 1 is inserted in a collet 2 from the rear. The end face 3 of the collet is pressed against the flange of a non-depicted headstock of a turning lathe, the flange engaging an annular recess 4 on the end face 3 of the collet. Seated on the outside of the collet 2 is a likewise non-depicted adapter sleeve which comprises an inner cone that presses against a cone 5 of the collet. Headstock, adapter sleeve, and collet are previously known from the prior art. The collet 2 is provided, uniformly distributed over the circumference, with three slots 6, 7, and 8 which run rearward from the end face 3 and end at a non-slotted annular area 9. The collet has at the front three clamping jaws 10, 11, and 12 which bound a receiving bore, provided with circular grooves 13, for receiving a non-depicted workpiece. The collet stop 1 comprises a clamping disk 15 which is inserted in the collet 2 from the rear, an appendage 16 of the clamping disk resting against the rear edge 17 of the collet. Disposed in an annular recess 136 of the clamping disk 15 is an annular nut 20 having an internal thread 19, provided with two axial bores 18 and 137 for insertion of a wrench. Disposed in the region of the slots 6, 7, and 8 is a chuck body 21 having an annular appendage 141 which, together with the complete collet stop 1, is inserted in the collet from the rear, three uniformly spaced, radially extending tapped bolts 25, 26, and 27 provided with threads 22, 23, and 24 being screwed into the chuck body during insertion of the complete collet stop 1. The chuck body 21 is provided with an internal thread 28. The chuck body 21 is provided on its circumference with an O-ring 29 for retaining the coolant during the machining of the workpiece chucked in the collet. Screwed together with the annular nut 20 and the chuck body 21 is a tightening screw 31 having an external thread 30. Between the clamping disk 15 and the tightening screw 31, a spacer disk 32 is disposed. The tightening screw 31 has a milled knob 33 for twisting the tightening screw 31 relative to the chuck body 21. Upon twisting of the tightening screw 31 clockwise, the chuck body 21 is displaced to the rear, thus toward the left according to FIG. 1. The annular appendage 141 of the chuck body 21 engages around an annular shoulder 142 of the clamping disk upon displacement of the chuck body 21. Before tightening of the tightening screw 31, the tapped bolts 25, 26, and 27 are screwed out of the chuck body 21 by means of a hexagonal wrench until their upper conical ends 34, 35, and 36 are in the region of the wall 37 of the collet. Through tightening of the tightening screw 31, the conical ends 34, 35, and 36 of the tapped bolts, provided with a hexagonal socket (Inbus), are pressed against the rearward ends 38, 39, and 40 of the slots 6, 7, and 8. If the slots are inaccurately worked, then by adjustment of the tapped bolts, as a result of the conical formation of their ends 34, 35, and 36, it can be achieved that the tapped bolts rest everywhere against the ends 38, 39, and 40 of the slots. The displacement movement of the chuck body 21 relative to the tightening screw 31 is guided by three cap screws 41, 42, and 43. These screws are driven into the chuck body 21 and move in cylindrical recesses 44, 45, and 46 of the clamping disk 15. A threaded pin 63 having a hexagonal socket (Inbus)

extends, as is apparent from FIG. 2, in axial direction through the rear part of the tightening screw 31 and presses on the spacer disk 32 and thereby secures the tightening screw 31 against loosening. Screwed into an internal thread 47 of the tightening screw 31 is a threaded rod 48 having an external thread 49. The threaded rod 48 is provided at its rearward end with a hexagonal socket (Inbus) 50 for adjustment of the threaded rod 48 in the longitudinal axis. At its front end, the threaded rod 48 is provided with a shoulder 51, on which shoulder a stop disk 52 is set. Depending upon the inside diameter of the collet between the clamping jaws, stop disks for the workpiece to be machined of different diameter may be used. Stop disks 52 are used when the diameter of the workpiece is greater than the diameter of the threaded rod. In the longitudinal axis of the threaded rod 48, a hexagonal-socket setscrew 53 is provided, which is driven by means of an external thread 54 into an internal thread 55 of the threaded rod. The conical front end 56 of the setscrew presses the front part 51 of the threaded rod somewhat apart through pressure action upon an inner projection 135 of the threaded rod and thus secures the stop disk 52 against pulling away from the threaded rod when the machined workpiece, which is possibly still adhering to the stop disk 52 through an oil film, is removed from the collet. The rearward end 57 of the threaded rod is preferably likewise milled. Through twisting of the threaded rod 48, the desired stop depth for the workpiece to be machined is set. By means of a threaded pin 59 provided with a hexagonal socket 48, the threaded rod 48 may be secured against twisting. The threaded pin braces the tightening screw 31 in the region of a slot 60 in that the pin is pressed against the rear surface 61 of the slot.

In FIG. 2, a view from the left according to FIG. 1 of the collet is depicted. From this figure, the threaded pin 63 provided with a hexagonal socket 62 for securing the tightening screw against loosening is additionally also depicted. The threaded pin 63 presses in the locking position against the spacer disk 32 (see also FIG. 3). Instead of three slots 6, 7, and 8, the collet might also have four slots. Therefore, preferably six bores provided with thread are provided at the periphery of the chuck body for the reception either of three or of four tapped bolts.

In FIG. 3, a collet 65 having a receiving bore 66 for workpieces of small diameter is depicted. Accordingly, the clamping jaws 67 and 68 also have a greater wall thickness. Instead of the stop disk, a stop bolt 69 is provided for workpieces of the same or smaller diameter than that of the threaded rod 48. The stop bolt 69 has at its rearward end a conically widened part 70 which is followed by a cylindrical sleeve 71. The cylindrical sleeve 71 is slipped onto the appendage 51 of the threaded rod 48 and secured by the setscrew 53. Otherwise the collet stop according to FIG. 3 is constructed the same as that according to FIGS. 1 and 2. The threaded rod 48 is provided in its region facing the stop disk 52 or the stop bolt 69 with three slots 138 reaching up to the front end of the shoulder 51 so that the shoulder 51 may be spread apart for holding the collet disk or the stop bolt.

Figure 4:
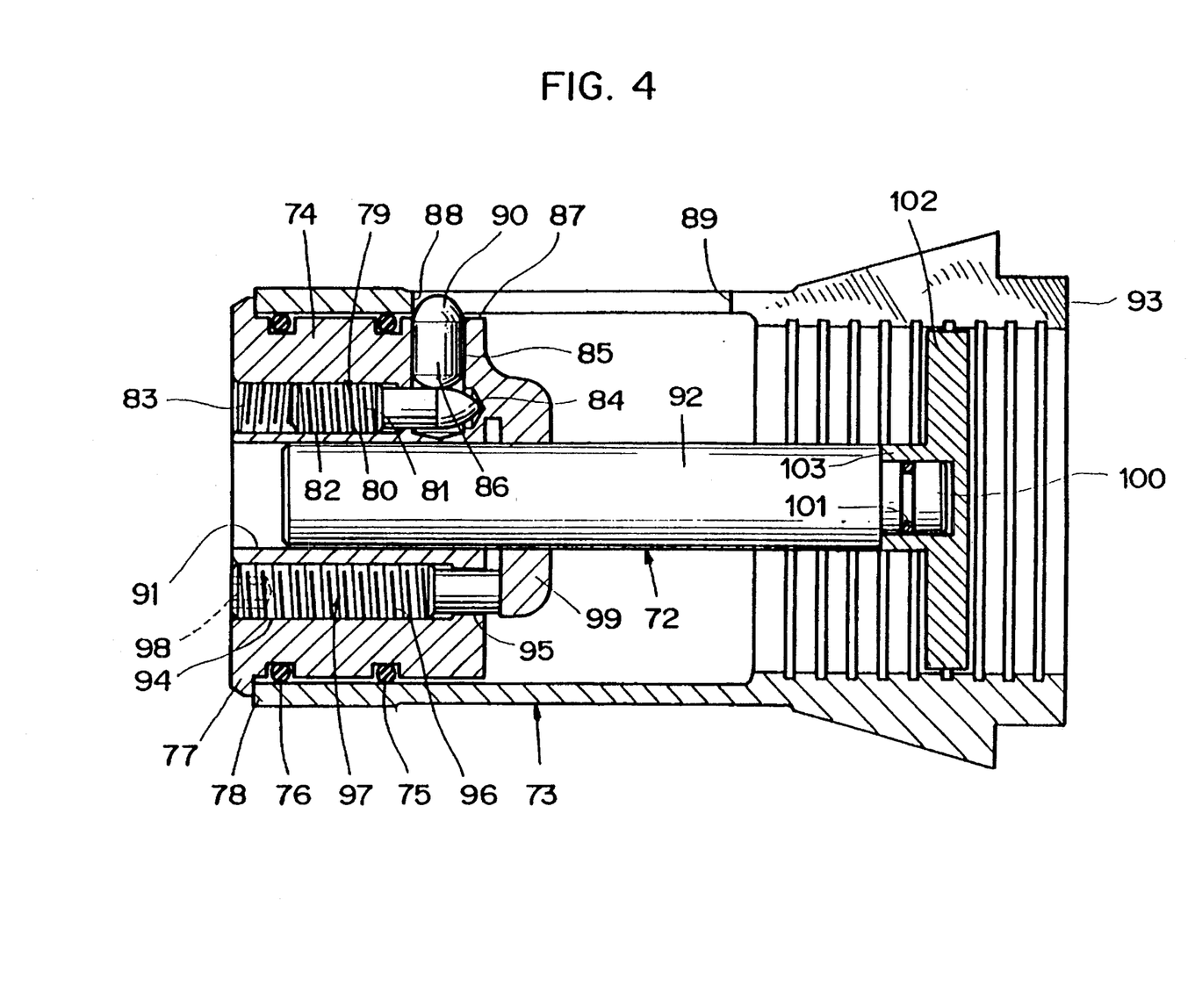
FIG. 4 shows a longitudinal section through a second exemplified embodiment of the collet stop with the use of stop disks.

The collet stop 72 for the collet 73 according to the second embodiment is depicted in FIG. 4. The collet stop according to this figure is suited to dividing apparatuses for drilling and milling. In this connection, the dividing apparatus is closed in the rear region of the collet so that no parts as in the first embodiment may project out rearwardly. The chuck body 74 inserted in the collet from the rear has at its periphery two spaced O-rings 75 and 76 for sealing against coolant. By means of an appendage 77, the chuck body 74 rests against the rear edge 78 of the collet. Three hexagonal-socket setscrews 79 are disposed parallel to the axis of the collet at regular intervals in the chuck body. The setscrews 79 have a rear part 80 with an external thread 81 which is screwed into an internal thread 82 of a cylindrical opening 83 in the chuck body. With the aid of the rear hexagonal socket (Inbus) disposed in the setscrew, the setscrew may be adjusted by means of a hexagonal wrench. The front part 84 of the setscrew is formed tapering. Upon insertion of the chuck body 74 in the collet, the setscrews 79 are in a rear position, and the three clamping studs 86 situated in radially running openings 85 do not project beyond the outer circumference 87 of the chuck body 74. Upon turning-in of the setscrews 79, the clamping studs 86 are displaced outwardly and pressed against the rear edge 88 of the slots 89 and secure the chuck body 74 in the machining position. The clamping studs 86 are formed tapered in the front region 90, preferably domed, which makes it possible to stop all three clamping studs 86 at the rear edge of the slots 89 even when the three slots 89 of the collet are not worked exactly the same. Through an axially running central opening 91 of the chuck body 74 there runs an adjustment bolt 92 variable in length according to what distance from the end face 93 of the collet the workpiece to be machined is supposed to be stopped. Disposed in an axially running cylindrical opening 95 provided with an internal thread 94 is a clamping screw 97 provided with external thread 96 and having a hexagonal socket 98. The clamping screw 97 acts upon a chuck lever 99 disposed in the front region of the chuck body 74, engaging about the adjustment bolt 92, by means of which chuck lever the adjustment bolt 92 can be locked in the desired position. The adjustment bolt 92 has at its front end a shoulder 100 in which a circlip 101 is embedded. Upon slipping of the stop disk 102 with the cylindrical sleeve 103 onto the appendage 100, the stop disk 102 is held on the adjustment bolt 92 by the circlip 101.

Also in the second exemplified embodiment according to FIG. 4, instead of the variable stop disk for workpieces to be machined having a larger diameter than the diameter of the adjustment bolt 92, a stop bolt, as in FIG. 2, might be used for workpieces of the same or smaller diameter than the adjustment bolt 92.

Figure 5:
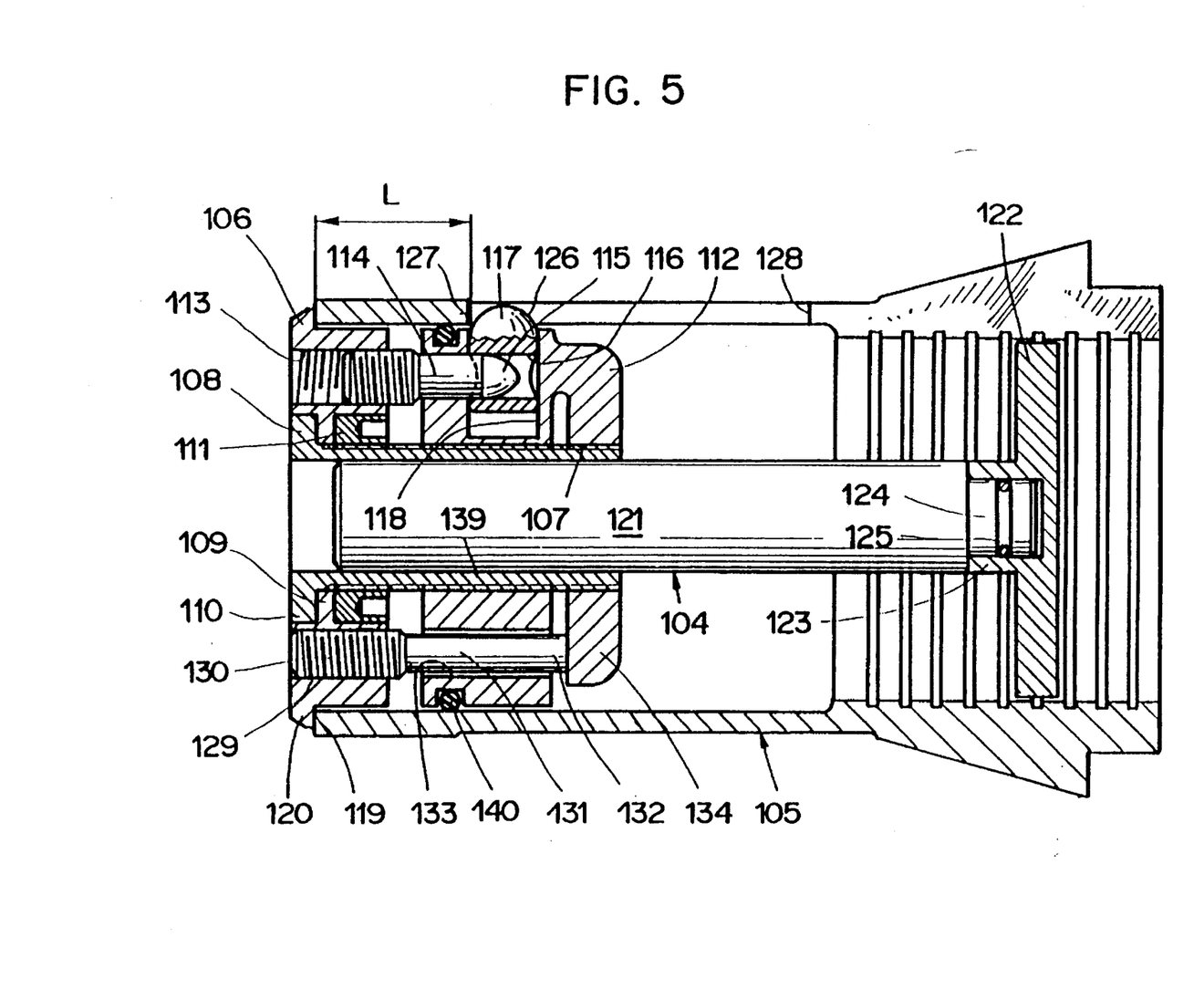
FIG. 5 shows a longitudinal section through a third exemplified embodiment of the collet stop.

In FIG. 5, a third embodiment of the invention is depicted. The collet stop 104 according to this embodiment is, as in the case of the second embodiment according to FIG. 4, likewise used whenever the collet 105 is utilized in dividing apparatuses for drilling or milling. Inserted in a clamping disk 106 is a tapped sleeve 108 provided with an external thread 107. An appendage 109 of the clamping disk 106 rests against a rear edge 110 of the tapped sleeve 108. An annular nut 111 is screwed on the tapped sleeve 108 and rests against the appendage 109 of the stop disk. Furthermore, a threaded chuck body 112 is screwed on the tapped sleeve 108. Disposed at regular intervals in the clamping disk 106 are three tapped bores 113 into which three setscrews 114 are driven. The setscrews 114 have a part 115 formed tapering at the front which engage in bores 116, running parallel to the longitudinal axis of the collet stop, of three clamping studs 117 disposed at regular intervals in the threaded chuck body 112. The clamping studs 117 are displaceably disposed in radial bores 118. The desired length L between an appendage 120 of the stop disk resting against the rear edge 119 of the collet and the rear edge of the bore 118 is pre-set by twisting of the threaded chuck body 112 on the tapped sleeve 108 outside the collet. According to the diameter of the workpiece to be machined and the required chucking length, a suitable adjustment bolt 121 as well as a suitable stop disk 122 are selected and plugged into the exact bore 138 of the tapped sleeve 108. The stop disk 122 rests by means of a cylindrical sleeve 123 on an appendage 124 of the adjustment bolt 121 and is held by means of a circlip 125. The complete collet stop is inserted, with setscrews 114 screwed all the way out, into the collet 105 from the rear, it being heeded during insertion that the three clamping studs 117 agree with the clamp slots 128. The setscrews 114 are evenly driven in and the tapered, preferably domed upper part 126 of the three clamping studs 117 thereby pressed against the upper edge 127 of the three clamp slots 128. A tightening screw 131 provided in the rear region with a thread 130 is screwed in an axially running bore 129 of the clamping disk 106. By tightening this tightening screw 131, its front part 132, which is guided in an axial bore 133 of the threaded chuck body 112, is pressed against a chuck lever 135 connected to the threaded chuck body and engaging about the adjustment bolt, the adjustment bolt 121 being thereby securely clamped in the desired position. The threaded chuck body 112 is provided on its outer circumference with an O-ring 135 for retaining the coolant. Instead of the stop disks 122, stop bolts might also be used as in the first and second embodiments.

Figure 6:
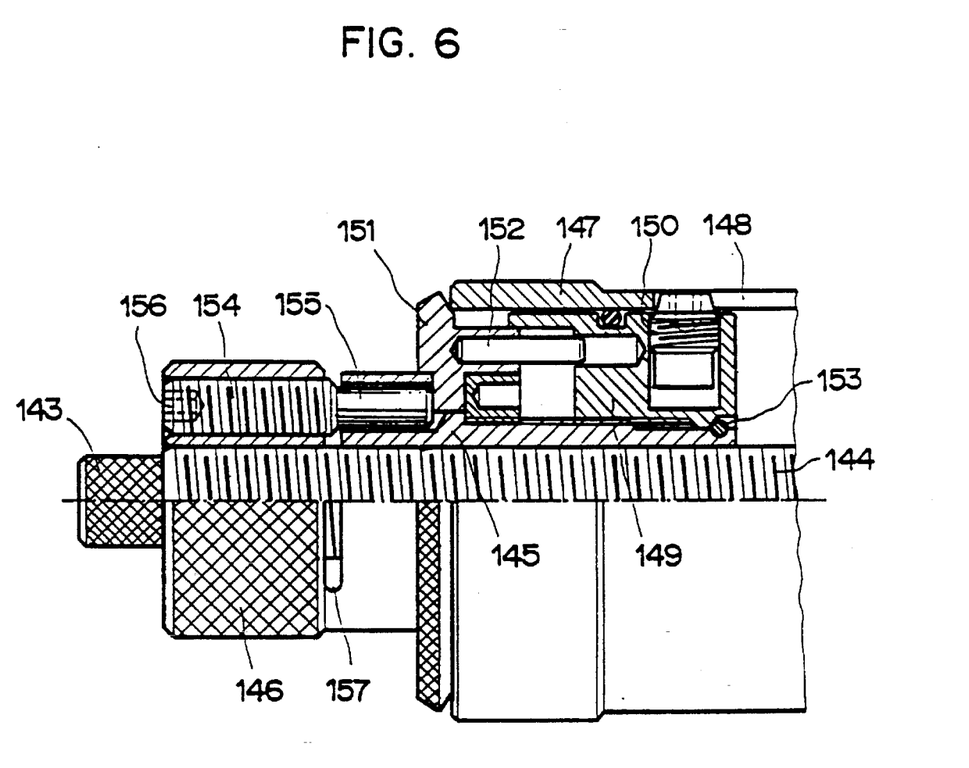
FIG. 6 shows a longitudinal section through the rear part of a fourth exemplified embodiment.

FIG. 6 shows a partial section through the rear part of a fourth exemplified embodiment of a collet stop. A threaded rod 144 provided with a milled end 143 extends axially through the tightening screw 145 with the milled knob 146. Disposed in the collet concentrically with the tightening screw in the annular region 147 and partially in the slotted region 148 is a chuck body 149, three or four radially extending tapped bolts 150 provided with threads being disposed in matching tapped bores in the chuck body. Six bores are provided. The tapped bolts are distributed on the circumference in such a way that the collet stop can be used both for a collet having three slots and for a collet having four slots. Set on the rear edge of the annular region 147 is a clamping disk 151. Several pins 152 are provided, which extend into corresponding openings in the clamping disk 151 and in the chuck body 149. Disposed at the end of the tightening screw 145 remote from the knob 146 is a clamping ring 153. The tapped bolts 150 are formed conical at their ends projecting into the slots of the collet and have a hexagonal socket at this end. Screwed in the knob 146 is a threaded pin 154 extending parallel to the threaded rod, which pin is provided at its end remote from the pin-shaped part 155 with a hexagonal socket 156 for twisting. Provided in the handle is a slot 157 which extends perpendicular to the longitudinal axis of the collet stop. Through twisting of the threaded pin 154, the pin-shaped part 155 presses on the clamping disk 151, whereby the tightening screw 145 is braced in the region of the slot 156. The threaded rod 144 can thereby be secured against twisting. Furthermore, upon stopping of the pin-shaped part 155 on the clamping disk 151, the tightening screw 145 is secured against further twisting. In this embodiment, the entire clamping disk 151 is hardened. In contrast to the embodiment according to FIGS. 1 to 3, the two locking operations can be undertaken with a single threaded pin.

The collet stop according to all embodiments is suited for use with conventional collets. For each collet stop, a set of stop disks and stop bolts of variable diameter can be made available.

We claim:

1. A collet stop comprising an organ and radially projecting chucking elements intended for engaging in slots of a collet; and a stop means extending through the chucking organ for a workpiece to be machined, characterized in that the chucking elements are formed as tapped bolts screwable into the chucking organ formed as a cylindrical chuck body and are disposed radially displaceably, and locking means are provided for locking the stop means in an adjustable axial position.

2. The collet stop according to claim 1, characterized in that outer ends (34, 35, 36) of the tapped bolts (25, 26, 27) are formed conical.

3. A collet stop comprising an organ and radially projecting chucking elements intended for engaging in slots of a collet; and a stop means extending through the chucking organ for a workpiece to be machined, characterized in that the chucking elements are disposed radially displaceably, and locking means are provided for locking the stop means in an adjustable axial position at least one clamping means extending through the chucking organ the clamping means is formed as a tightening screw provided with an external thread and screwable into an internal thread of the chucking organ the stop means comprises a threaded rod screwable into an internal thread of the tightening screw, the threaded rod having at one of its ends a shoulder as well as at least one slot.

4. A collet stop comprising an organ and radially projecting chucking elements intended for engaging in slots of a collet; and a stop means extending through the chucking organ for a workpiece to be machined, characterized in that the chucking elements are disposed radially displaceably, and locking means are provided for locking the stop means in an adjustable axial position, the stop means is formed hollow, and disposed in the longitudinal axis of the stop means in the hollow space is a setscrew provided with a thread, which setscrew is formed conical at one end, the conical end being intended for co-operating with an inner projection of the stop means.

5. A collet stop comprising an organ and radially projecting chucking elements intended for engaging in slots of a collet; and a stop means extending through the chucking organ for a workpiece to be machined, characterized in that the chucking elements are disposed radially displaceably, axially displaceable setscrews acting upon the chucking elements for radial displacement thereof are disposed in the chucking organ, and locking means are provided for locking the stop means in an adjustable axial position.

6. The collet stop according to claim 5, characterized in that the setscrews (79; 114) are formed tapered at their ends co-operating with the chucking elements (86; 117).

7. The collet stop according to claim 5, characterized in that the chucking elements (86; 117) are formed tapered at their end remote from the longitudinal axis of the chucking organ (74; 112).

8. A collet stop comprising an organ and radially projecting chucking elements intended for engaging in slots of a collet; and a stop means extending through the chucking organ for a workpiece to be machined, characterized in that the chucking elements are disposed radially displaceably, and locking means are provided for locking the stop means in an adjustable axial position, and an axially displaceable clamping screw co-operating with a chuck lever connected to the chucking organ is disposed in the chucking organ for the axial locking of the stop means extending through the chucking organ and the chuck lever.

9. A collet stop comprising an organ and radially projecting chucking elements intended for engaging in slots of a collet; and a stop means extending through the chucking organ for a workpiece to be machined, characterized in that the chucking elements are disposed radially displaceably, locking means are provided for locking the stop means in an adjustable axial position, and the chucking organ is formed as a chuck body provided with an internal thread, which chuck body is screwed onto a tapped sleeve.

10. The collet stop according to claim 9, characterized in that the tapped sleeve (108) is held in a clamping disk (106) intended to be set on the rear edge (119) of a collet (105).

11. A collet stop comprising an organ and radially projecting chucking elements intended for engaging in slots of a collet; and a stop means extending through the chucking organ for a workpiece to be machined, characterized in that the chucking elements are disposed radially displaceably, and locking means are provided for locking the stop means in an adjustable axial position at least one clamping means extending through the chucking organ, the locking means comprise a threaded pin screwed into the knob of the clamping means formed as a tightening screw, which threaded pin extends through a slot provided in the tightening screw.

12. A collet stop comprising an organ and radially projecting chucking elements intended for engaging in slots of a collet; and a stop means extending through the chucking organ for a workpiece to be machined, characterized in that the chucking elements are disposed radially displaceably, and locking means are provided for locking the stop means in an adjustable axial position, at least one clamping means extending through the chucking organ, a threaded pin screwed into the knob of the clamping means formed as a tightening screw is provided for securing the tightening screw against loosening.

13. A collet stop comprising an organ and radially projecting chucking elements intended for engaging in slots of a collet; and a stop means extending through the chucking organ for a workpiece to be machined, characterized in that the chucking elements are disposed radially displaceably, locking means are provided for locking the stop means in an adjustable axial position, at least one clamping means extending through the chucking organ, and a threaded pin is screwed into the knob of the clamping means formed as a tightening screw for locking the stop means and for securing the tightening screw against loosening, which threaded pin extends through a slot provided in the tightening screw and presses in its locking position against the clamping disk.

* * * * *

UNITED STATES PATENT AND TRADEMARK OFFICE
CERTIFICATE OF CORRECTION

PATENT NO. : 5,474,308
DATED : December 12, 1995
INVENTOR(S) : Hansjurg Moser

It is certified that error appears in the above-indentified patent and that said Letters Patent is hereby corrected as shown below:

Column 6, claim 2, line 6, please remove "(34,35,36)" and "(25,26,27)".

Column 6, claim 6, line 44, please remove "(79; 114)" and column 6, line 45, "(86;117)".

Column 6, claim 7, line 47, please remove "(86; 117)" and column 6, line 49, "(74; 112)".

Column 7, claim 10, line 4, please remove "(108)" and "(106)" and column 7, line 5, please remove "(119)" and "(105).

Signed and Sealed this

Nineteenth Day of March, 1996

Attest:

BRUCE LEHMAN

Attesting Officer
Commissioner of Patents and Trademarks